US008296324B2

(12) United States Patent
Strumpf et al.

(10) Patent No.: US 8,296,324 B2
(45) Date of Patent: *Oct. 23, 2012

(54) SYSTEMS AND METHODS FOR ANALYZING, INTEGRATING AND UPDATING MEDIA CONTACT AND CONTENT DATA

(75) Inventors: Kurt Strumpf, Monroe, CT (US); Jon Victor, New Canaan, CT (US)

(73) Assignee: eNR Services Inc., Norwalk, CT (US)

( * ) Notice: Subject to any disclaimer, the term of this patent is extended or adjusted under 35 U.S.C. 154(b) by 352 days.

This patent is subject to a terminal disclaimer.

(21) Appl. No.: 12/605,998

(22) Filed: Oct. 26, 2009

(65) Prior Publication Data
US 2010/0106702 A1 Apr. 29, 2010

Related U.S. Application Data

(63) Continuation-in-part of application No. 11/257,279, filed on Oct. 24, 2005.

(60) Provisional application No. 61/279,205, filed on Oct. 24, 2008, provisional application No. 60/627,666, filed on Nov. 12, 2004, provisional application No. 60/645,858, filed on Jan. 20, 2005.

(51) Int. Cl.
*G06F 7/00* (2006.01)
(52) U.S. Cl. ...................................................... 707/790
(58) Field of Classification Search .................. 707/790, 707/772
See application file for complete search history.

(56) References Cited

U.S. PATENT DOCUMENTS

| 5,577,241 | A | * | 11/1996 | Spencer ................................. | 1/1 |
| 5,819,092 | A | | 10/1998 | Ferguson et al. | |
| 5,832,499 | A | | 11/1998 | Gustman | |
| 6,038,573 | A | | 3/2000 | Parks | |
| 6,092,080 | A | | 7/2000 | Gustman | |
| 6,173,287 | B1 | | 1/2001 | Eberman et al. | |
| 6,353,831 | B1 | * | 3/2002 | Gustman ........................ | 707/740 |
| 6,618,727 | B1 | * | 9/2003 | Wheeler et al. ................ | 707/748 |
| 7,305,385 | B1 | * | 12/2007 | Dzikiewicz et al. ........... | 707/745 |
| 7,716,251 | B2 | | 5/2010 | Chang et al. | |
| 8,140,595 | B2 | * | 3/2012 | Dettinger et al. .............. | 707/809 |
| 2002/0152245 | A1 | * | 10/2002 | McCaskey et al. ........... | 707/530 |
| 2004/0179102 | A1 | | 9/2004 | Matsufune | |
| 2010/0287458 | A1 | * | 11/2010 | Guller et al. .................. | 715/205 |

OTHER PUBLICATIONS

Non-final Office Action mailed Apr. 13, 2011 in U.S. Appl. No. 11/257,279, 34 pages.
Final Office Action mailed Aug. 5, 2011 in U.S. Appl. No. 11/257,279, 43 pages.

* cited by examiner

*Primary Examiner* — Hung Q Pham
*Assistant Examiner* — Hubert Cheung
(74) *Attorney, Agent, or Firm* — Fish & Richardson P.C.

(57) ABSTRACT

A computer implemented system for integrating and searching media related databases comprising a first server for receiving digital content from at least one of a plurality of sources, a second server for receiving queries from at least one of a plurality of user computing devices, and a database access layer being utilized by the first and second servers to read and write to a plurality of databases. The plurality of databases comprise a content database and a media database. The content database receives at least one article of digital content from the first server via the database access layer and stores the at least one article. The media database contains at least one journalist data and media outlet data. A mapping module matches journalist data and media outlet data to at least one journalist data and media outlet data contained in the media database.

21 Claims, 10 Drawing Sheets

MatchPoint

Point

Offshore drilling debunked - Sierra Club NYC advisory No benefit in offshore and domestic drilling, say Bush Administration studies New York, NY - Sarah Palin, a self-described energy expert, implies that we now rely on imported oil because we refuse to drill abundant domestic supplies. DOE reports that the US already consumes 25% of the world's oil while we have less than 3% of the world's proven oil reserves. In addition, the DOE's Enery Information Agency reported that in the best case scenario, in 20 years, offshore drilling

[Match] [Clear]

50

MatchPoint Media Tab 100     102    104

MatchPoint ✓ relevance  recency  frequency                                            60        [Blogs]  64  [Media] 62

| Journalist | Last Date | Relevance | Select |
|---|---|---|---|
| Charlotte Moore | 10/05/2008 | | |
| [Print] DRILLING FOR DOLLARS | | Source: Roanoke Times | ▶ |
| Emma Rous | 09/13/2008 | | |
| [Online] Oil drilling won't help schools in N.H. | | Source: Portsmouth Herald | ▶ |
| Emily Heffter | 09/08/2008 | | |
| [Print] Radio ad distorts Darcy Burner's position | | Source: Seattle Times | |
| [Print] Radio ad distorts Burner's position | | Source: Seattle Times | ▶ |
| THOMAS L. FRIEDMAN | 09/03/2008 | | |
| [Print] And Then There Was One | | Source: New York Times | ▶ |
| Jason Embry | 10/14/2008 | | |
| [Online] Cornyn, Noriega differ on energy, environment | | Source: Austin American-Statesman | ▶ |
| MICHEAL BACHMANN | 08/21/2008 | | |
| [Print] AS A NATION SAYS "DRILL" NANCY SAYS "STALL" | | Source: New York Post | ▶ |
| Peter Fimrite | 09/17/2008 | | |
| [Print] Support for drilling tempered with caution | | Source: San Francisco Chronicle | ▶ |
| MARYCLAIRE DALE | 10/14/2008 | | |
| [Online] Clinton's rejoinder Jobs, baby, jobs | | Source: The Augusta Chronicle | ▶ |
| Steve Gelsi | 09/18/2008 | | |
| [Online] "Drill baby drill" in Congress | | Source: Market Watch | |
| [Online] "Drill baby drill" heard in Congress | | Source: Market Watch | |
| Steve Huff | 10/06/2008 | | |

MatchPoint

Point

Offshore drilling debunked - Sierra Club NYC advisory No benefit in offshore and domestic drilling, say Bush Administration studies New York, NY - Sarah Palin, a self-described energy expert, implies that we now rely on imported oil because we refuse to drill abundant domestic supplies. DOE reports that the US already consumes 25% of the world's oil while we have less than 3% of the world's proven oil reserves. In addition, the DOE's Enery Information Agency reported that in the best case scenario, in 20 years, offshore drilling

[ Match ] [ Clear ]

MatchPoint Article Detail — 94 http://mp.dev.enr-corp.com – Matchpoint Print Article – Microsoft Internet Explorer

DRILLING FOR DOLLARS

From Roanoke Times (VA)
By: Charlotte Moore

I like to think that nonsense sinks of it's own weight, but as we learned from being rushed into Iraq, when stupidity is expressed with enough force and frequency, it has a way of becoming national policy.

First, the claim that there are deposits of mass salvation under America's public lands and waters is bogus. We have only 2.2 percent of the globe's known reserves, yet we consume 25 percent of the world's oil, sucking up 7.5 billion barrels a year. If we extracted all of the oil out of the Artic National Wildlife Refuge in Alaska, that would be 10.4 billion barrels, just a year and a half supply.

Likewise, place a wall of drilling platforms offshore of every beach on our seacoasts, suck up all the oil that exists there, and we'd have enough for only another two years. That's it. Reported this year by Bush's own Energy Information Administration, this amount of crude, even if it began flowing tomorrow, we would have an insignificant effect on pump prices. (I think Bush tried to stop this report, at one time).

Second, no drilling or delivery of oil would be available. Drilling ships are booked solid for five years in the future. Plus, it would take 20 years after leasing began for production to flow into the market. ANWR oil would not begin flowing until 2018. So, don't hold your breath, even if the dipsticks win.

Third (been kept quiet), once the oil giants stat pumping oil America publicly owned lands and water, this liquid gold is not likely to stay in the U.S. market. These giants sell in the open market to highest bidder. They are not public-spirited institutions. They are bottom-line profiteers, with no loyalty Done   ○ Internet Steve Geisi                        09/18/2008                        *Source: Market Watch*
 Online  "Drill baby drill" in Congress
 Online  "Drill baby drill" heard in Congress                       *Source: Market Watch*

[ Blogs ] [ Media ]
*Select*

FIG. 11

SYSTEMS AND METHODS FOR ANALYZING, INTEGRATING AND UPDATING MEDIA CONTACT AND CONTENT DATA

CROSS REFERENCE TO RELATED APPLICATIONS

This application claims priority to U.S. Provisional Patent Application Ser. No. 61/197,205, which was filed on Oct. 24, 2008 and entitled "System and Method for Analyzing, Integrating and Updating Media Contact and Content Data," and is a continuation-in-part of U.S. patent application Ser. No. 11/257,279, which was filed on Oct. 24, 2005 and entitled "System and Method for Analyzing, Integrating and Updating Media Contact and Content Data," and which claims priority from U.S. Provisional Patent Application Ser. No. 60/627,666, which was filed on Nov. 12, 2004 and entitled "Media Contact Base and Integrated Text Analysis Software," and U.S. Provisional Patent Application Ser. No. 60/645,858, which was filed on Jan. 20, 2005 and entitled "Media Database Updating Through Text Analysis." Each previous application is incorporated herein by reference in its entirety.

BACKGROUND OF THE INVENTION

Media service companies maintain media contact databases ("MCDs") containing thousands of media sites in the US and Canada, including daily and weekly newspapers, magazines, radio stations, TV stations and internet sites, including blogs. The MCDs provide extensive contact information on each media site, such as address, telephone, fax, email, station format and call letters (broadcast media) data.

In addition, MCDs contain data relating to every journalist (approximating 250,000-350,000 journalists) at each of these media sites that has editorial responsibilities including the ability and responsibility to generate independent content. Thus, for example, advertising directors are typically not included in an MCD whereas all reporters, newscasters and bloggers are included in the database. The MCD contains all relevant contact information on each journalist and blogger, including address, telephone, fax and email, as well as the individual's preferred method of receiving press releases (mail, fax or email). Additionally, the MCD also contains each journalist's or blogger's "beat," or the individual's subject/content area of responsibility. Beats include such titles as News, Features, Sports, Business, Entertainment, Technology, etc.

Public relations professionals use the MCD on behalf of their clients to identify individual journalists or bloggers that might be most receptive to writing an article on the client. A toy company, for example, might retain a public relations professional to promote the release of a new toy. Typically, the public relations professional would first draft a press release announcing the new toy. The public relations professional would then utilize the MCD to generate a list of journalists or bloggers who would be sent a press release, and maybe even a product sample.

The MCD contains a search facility that generates media contact lists according to defined search parameters, including media type, geography and beat. In the above example, the public relations professional might draft a release targeted to business editors and the trade press. The release would discuss the importance of this new toy to the company's product line and perhaps how this new toy extends the company's lead in a segment over its competitors. The public relations professional would then develop a media list consisting of business editors at the major daily newspapers, trade magazines and the major broadcast business shows. Depending on the search criteria, this list might include between 10 to 10,000 journalists. The public relations professional would then try to refine the list by accessing "pitching tips," or notes that subjectively describe a journalist's primary area of interest. Pitching tips are available through commercial providers and many public relations professionals also maintain a proprietary compilation of pitching tips.

These pitching tips, however, are typically subjective, often out-of-date, and never available for more than a handful of journalists. Accordingly, refining the list generated through the MCD search is often subjective and tedious.

Systems widely available today allow the public relations professional to upload the press release into an online application, and an integrated distribution capability distributes the release to every member of the media list according to the preferred method of receipt.

The current methods of targeting journalists and/or bloggers utilizing beat or pitching tips are crude and tedious. Neither method works very well or efficiently. For example, many of the business reporters targeted above may be inappropriate recipients of the press release (and product sample). A journalist covering currency trading in Asia (obviously inappropriate) would be labeled a business reporter in the MCD, just as a journalist covering consumer product companies (more appropriate) would be labeled a business reporter in the MCD. Incorrect targeting entails substantial costs. Product samples sent awry are clearly a waste of money. But, time spent by public relations professionals pitching stories to journalists "off beat" wastes values time and effort. Moreover, bloggers often react adversely to misdirected press releases. In fact, at times bloggers have taken aim in their blogs at the public relations professional that sent the misdirected press release and have even unfairly criticized the company issuing the press release. Conversely, pitches that can be accurately targeted would be expected to produce a better result (more coverage in the press) at a lower cost.

Another problem encountered in the prior art is the time consuming and expensive problem of maintaining the currency and accuracy of the MCD. The MCD is a large, complex database typically consisting of over 250,000-350,000 entries, and each entry entails numerous data elements (name, address, etc.). The MCD, therefore, consists of millions of data elements that must be maintained and updated continuously.

The MCD requires constant updating. Journalists are continuously switching jobs and beats. Media sites (especially magazines and blogs) are continuously launched and closed. And both, media sites and journalists have proven unresponsive to potentially more economic, but impersonal, means (email, direct mail) of verifying relevant MCD data.

The currency and accuracy of the MCD has proven the key to customer satisfaction. Telemarketing has proven, and is currently, the only viable method of maintaining the currency of the MCD. Accordingly, companies that endeavor to maintain a media contact database expend significant sums on personally telephoning every media site and every journalist in the MCD to verify database elements.

But, telemarketing entails practical limits on the quality of the MCD. For instance, it is not possible to update the MCD daily. Even if it were possible to make 350,000 phone calls in one day, journalists would be extremely irritated after the first couple of days. MCD data, however, does change daily (on any given day, journalists change jobs, beats, or may die; media sites change addresses or close). The net result is that every day the MCD is out-of-date, and any updating effort is too little, too late.

One current industry approach is to segment media outlets. So-called "Tier I" sites and journalists are updated (personally contacted by telemarketers) more often than those in "Tier II or III." As an example, a Tier I journalist might be updated six times a year; a Tier II journalist might be updated several times a year. But the tiers are typically constructed based upon the prominence of the media site. The New York Times, and its journalists, are updated far more frequently than the Kenosha Express. This approach, however, makes no sense to the user that wishes to contact the Kenosha Express, and who wants accurate data today regardless of the relative prominence of the newspaper.

SUMMARY OF THE INVENTION

It is an object of the invention to provide a method and system for integrating, updating, and searching media databases and building media lists and reports.

It is yet another object of the invention to provide a method and system which analyzes an author's (e.g., a journalist's or blogger's) output text to determine the individual's current focus. In other words, a journalist's or blogger's subject area of interest is determined according to the topics of the stories he actually writes.

It is a further object of the invention to provide an MCD Updating Process that will produce a substantial improvement in the currency and accuracy of the MCD at a substantial reduction in cost.

In one general aspect, there is provided a computer implemented system for integrating, updating, and searching media related databases and building media lists and reports comprising a first server for receiving digital content from at least one of a plurality of sources; a second server for receiving queries from at least one of a plurality of user computing devices; and a database access layer being utilized by the first and second servers to read and write to a plurality of databases, wherein the plurality of databases comprise a content database, a media database, a mapping database, and a report database. The content database receives at least one article of digital content from the first server via the database access layer and storing the at least one article. The media database receives at least one journalist or blogger data and media outlet data of digital content from the first server via the database access layer and stores the at least one journalist/blogger data and media outlet data. The mapping database stores mapping data between byline data and source outlet data of articles in the content database and journalist/blogger data and media outlet data in the media database for updating the media database. The report database stores user report requests.

Implementations may include one or more of the following features. For example, the system may include an indexing database for receiving the digital content from the first server and maintaining an index of the digital content and an archiver for receiving the digital content from the indexing database for managing the indexing database and storing the digital content. In some implementations, the archiver may include a full archive configured to store the complete text of the digital content for a predetermined period of days and a summary archive configured to store a summary of the digital content after the predetermined period of days. The indexing database may use a training document to search for articles with a predefined percentage of content and the indexing database may create a new category of such articles. In addition, the second server may include a list builder that queries the indexing database for a list of all articles including their mapped author identities in the newly created category. The list builder may sort the list of articles by relevance, apply filters as needed and look up media contact information for each article from the media database. Moreover, the list builder may present the resulting list of articles to the user computing device as a formatted web page with links to more detailed information including a list of recent headlines or storylines authored by the relevant author of each article, an abstract for each article, and a stored copy of the entire copy of each article.

The indexing database may return the results of a query including statistics and supporting articles to the report builder. In addition, the report builder may be configured to receive data from the media database and to provide the results of the query and the data to the user computing device as a formatted web page with custom industry reports and links to more detailed information. In some implementations, the data elements may include a headline, a media outlet source, and section where broadcast or print edition of the article was found.

The system also may include a mapping module configured to compare received digital content to mapping data stored in the mapping database and to store the digital content in a matched content database for articles that could be matched to journalists/bloggers or an unmatched content database for articles that could not be matched to journalists/bloggers.

In some implementations, the system may include a pre-parser configured to receive digital content including a plurality of articles and to parse out a plurality of data elements from each of the plurality of articles in the digital content. In such implementations, the plurality of data elements parsed out from each of the plurality of articles in the digital content may include at least one of headline, byline, date, media outlet source, content body, and section where broadcast or print edition of the article was found. The pre-parser may be configured to forward the parsed elements of digital content to the mapping module for comparison to mapping data stored in the mapping database. The parsed out elements of digital content may be stored in a matched content database for articles that could be matched to authors or stored in an unmatched content database for articles that could not be matched to authors. Additionally or alternatively, the pre-parser may be configured to generate a normalized XML file of the updated digital content data for processing by the indexing database.

Furthermore, the system may include a mapping database configured to store mapping data between byline data and source outlet data of articles in the content database and author data and media outlet data in the media database and to update the media database. Additionally or alternatively, the system may include a report database configured to store user report requests. The pre-parser may be configured to send the plurality of data elements from each article in the digital content to the mapping module for determining the mapping between each article's source and byline and the media outlet and author data in the media database. When the mapping module determines that a match is found, the section of the data elements may be used to confirm or update the author's beat or coverage data and the author is marked as active in the mapping database. Additionally or alternatively, when the mapping module determines that an author match is found at a different source, the mapping module may note the possible alternate source and the author data may be marked as requiring updating in the mapping database. Moreover, when the mapping module determines that no author match is found, an author and a source pair may be marked as new and stored in a daily exception report in the mapping database.

The system also may include an exceptions processor for pulling unmatched digital content data from the unmatched content database and formatting a call down project to telemarketers to update the unmatched digital content data and forward the updated digital content data to the content database via the mapping module. Additionally or alternatively, the exceptions processor also may be configured to process author data and remove duplicate data. Furthermore, the mapping module may be configured to send author data requiring updates to the exception processor for updating and the exception processor may be configured to send such data to a telemarketer for updating. The mapping module also may be configured to send the new author and source pair data to the exception processor for updating and the exception processor may be configured to send the new author and source pair data to a telemarketer for updating. The telemarketer may include contact information for the source and all parsed information relating to an author and the telemarketer may use a customized script to obtain and update relevant contact and beat information for an author. In addition, the telemarketer may forward the updated author data to the mapping module and the mapping module may be configured to forward the updated author data to the media database. The media database may be configured to mark an author data record with an appropriate update date.

The system also may include a simple search engine for providing at least one web page to at least one of the plurality of user computing devices for a user to enter various search criteria. The search criteria may include at least one of an author name, a media outlet name or a keyword. The simple search engine may receive search criteria from a user computing device and the simple search engine may create a query and compare query data to data in the matched content database. For example, the simple search engine may receive query results that include a mapping of the article contents and identifiers of the media outlet and the author with the related article. The simple search engine may query the media database for media contact data about the media outlet and author and then provide the results of the query to the user computing device as a formatted web page with links to more detailed information. Additionally or alternatively, the simple search engine may receive an uploaded press release document or a cut and paste content of a press release document at the at least one web page from one of the plurality of user computing devices. Moreover, the second server may include an upload document module for creating a new category in the indexing database using an application processing index and setting the uploaded press release document or the cut and paste content of the press release document as a training document for a press release.

The second server may include a system web page for user criteria including industry, brand names, and date range to be input by a user and a gathers report application for receiving the user criteria via the system web page. In such implementations, the gathers report application may be configured to parse the user input, generate a standard report request and forward the standard report request to the report database to be stored. Furthermore, the second server also may include a report builder configured to receive the standard report request from the report database and format queries against the indexing database.

In another general aspect, there is provided a method for searching media related databases comprising the steps of providing at least one web page to at least one of a plurality of user computing devices for a user to enter various search criteria at a simple search engine of a first server; creating a query at the first server and comparing query data to data in a matched content database including articles of digital content data received at a second server that could be matched to journalist/blogger data; providing query results to the user computing device as a formatted web page via the first server including a mapping of the article contents and identifiers of the media outlet and the journalist/blogger with the related article from a mapping module at the second server.

Implementations may include one or more of the following features. The media database may be queried for media contact data about the media outlet and author at the second server. In addition, the results of the query may be provided to the user computing device via the first server as a formatted web page with links to more detailed information.

According to yet another general aspect, there is also provided a method for searching media related databases comprising the steps of providing at least one web page to at least one of the plurality of user computing devices for a user to enter various search criteria at a simple search engine of a first server; receiving an uploaded press release document or a cut and paste content of a press release document at the at least one web page from one of the plurality of user computing devices; setting the uploaded press release document or the cut and paste content of the press release document as a training document for a press release, wherein the first server includes an upload document module for creating a new category in an indexing database of a second server of indexed digital content articles using an application processing index; using the training document at the indexing database to search for articles with a predefined percentage of content and creating a new category of such articles.

Implementations may include one or more of the following features. The indexing database may be queried at a list builder of the first server for receiving a list of all articles including their mapped author identities in the newly created category. Furthermore, the list of articles may be sorted by relevance, applying filters as needed and looking up media contact information for each article from a media database at the second server utilizing the list builder. Additionally or alternatively, the resulting list of articles may be presented to the user computing device via the first server as a formatted web page with links to more detailed information including a list of recent headlines or storylines authored by the relevant author of each article, an abstract for each article, and a stored copy of the entire copy of each article.

In still another general aspect, there is further provided a method for building custom media reports from a plurality of media related databases comprising the steps of providing at least one web page to at least one of the plurality of user computing devices from a gathers report application of a first server for a user to enter various user criteria comprising industry, brand names, and date range to be included in a custom media report; receiving the input user criteria at the gathers report application; parsing the input user criteria; generating a standard report request; forwarding the standard report request to a report builder and formatting queries against an indexing database of a second server of indexed digital content articles; receiving results of the query including statistics and supporting articles from the indexing database at the report builder; receiving media data including journalist/blogger and media outlet data from a media database at the report builder; and providing the results of the query and the media data to the user computing device as a formatted web page with custom industry reports and links to more detailed information.

In yet another general aspect, a method for integrating and updating a media related databases is provided. Digital content is received from at least one of a plurality of sources at a first server. At least one article of digital content is received from the first server and stored in a content database. At least one author and media outlet data of digital content is received from the first server and stored in a media database. Mapping data between byline and source outlet data of articles in the content database and author and media outlet data in the media database is stored in a mapping database to update the media database.

Implementations may include one or more of the following features. An index of the digital content received from the first server may be maintained in an indexing database. Additionally or alternatively, the indexing database may be managed and the digital content may be stored in an archiver. In some implementations, the complete text of the digital content may be stored for a predetermined period of days in a full archive section of the archiver and a summary of the digital content may be stored after the predetermined period of days in a summary archive section of the archiver.

In still another general aspect, a method for integrating and updating media related databases is provided. Digital content is received from at least one of a plurality of sources at a first server that includes a pre-parser. A plurality of data elements is parsed out from each of the plurality of articles in the digital content using the pre-parser. The plurality of data elements include at least one of headline, byline, date, media outlet source, content body, and section where broadcast or print edition of the article was found. The parsed out elements of digital content are forwarded to a mapping module for comparison to mapping data stored in a mapping database. The mapping data includes mapping data between byline and source outlet data of articles in a content database and author and media outlet data in a media database. For articles that could be matched to authors, the parsed out elements of digital content are stored in a matched content database. For articles that could not be matched to authors, the parsed out elements of digital content are stored in an unmatched content database. The unmatched digital content data is pulled from the unmatched content database at an exceptions processor of the first server and a call down project is formatted to telemarketers to update the unmatched digital content data. The updated digital content data is forwarded to a content database via the mapping module.

Implementations may include one or more of the following features. A normalized XML file of the updated digital content data may be generated at the pre-parser for processing by an indexing database that maintains an index of the digital content data. Additionally or alternatively, the XML file may be sent from the pre-parser to an XML feed that passes the XML file to the indexing database.

In an additional general aspect, a method for building custom media reports from a plurality of media related databases is provided. At least one web page is provided to at least one of the plurality of user computing devices from a gathers report application of a first server for a user to enter various user criteria including at least one of industry, brand names, and date range to be included in a custom media report. The input user criteria at the gathers report application is received. The input user criteria is parsed, and a standard report request is generated. The standard report request is forwarded to a report builder and queries against an indexing database of a second server of indexed digital content articles are formatted. Results of the query are received including statistics and supporting articles from the indexing database at the report builder. Media data including author and media outlet data is received from a media database at the report builder. The results of the query and the media data are provided to the user computing device as a formatted web page with custom industry reports and links to more detailed information.

In another general aspect, a computer implemented system for integrating and searching media related databases includes at least one server for receiving digital content from at least one of a plurality of sources and for receiving queries from at least one of a plurality of user computing devices. In addition, the system includes means utilized by the at least one server for reading and writing data to a plurality of databases, wherein the plurality of databases include at least a content database and a media database. The content database is configured to receive at least one article of digital content from the at least one server and to store the at least one article. The media database is configured to contain at least one author data and media outlet data for each piece of stored digital content. The system also includes a mapping module for matching author data and media outlet data from the received digital content to at least one author data and media outlet data stored in the media database.

In yet another general aspect, a method for integrating and searching media related databases is provided. At least one server is provided. In the at least one server, digital content is received from at least one of a plurality of sources. In addition, in the at least one server, queries are received from at least one of a plurality of user computing devices. Means utilized by the at least one server are provided for reading and writing data to a plurality of databases. The plurality of databases include at least a content database and a media database. At least one article of digital content is received and stored in the content database from the at least one server. Furthermore, at least one author data and media outlet data is stored in the media database for each piece of stored digital content. Author data and media outlet data from the received digital content is matched in a mapping module to at least one author data and media outlet data stored in the media database.

BRIEF DESCRIPTION OF THE DRAWINGS

The accompanying drawings, which are incorporated in and constitute a part of the specification, illustrate preferred embodiments of the invention and, together with the general description of the preferred embodiments given below, serve to explain the operation of the invention. It should be understood that the invention is not limited to the embodiments disclosed as examples, and is capable of variation within the scope of the appended claims. In the drawings.

FIG. 8 provides a screen shot of a web page based user search which includes at least a portion of the press release and a results report listing journalists and their associated articles that match the press release;

FIG. 10 provides a screen shot of a journalist detail report which provides contact information for the journalist as well a listing of articles authored by the journalist; and FIG. 11 provides a screen shot of an article detail report that includes at least a portion of the text for a selected article.

DETAILED DESCRIPTION OF THE INVENTION

Figure 1:
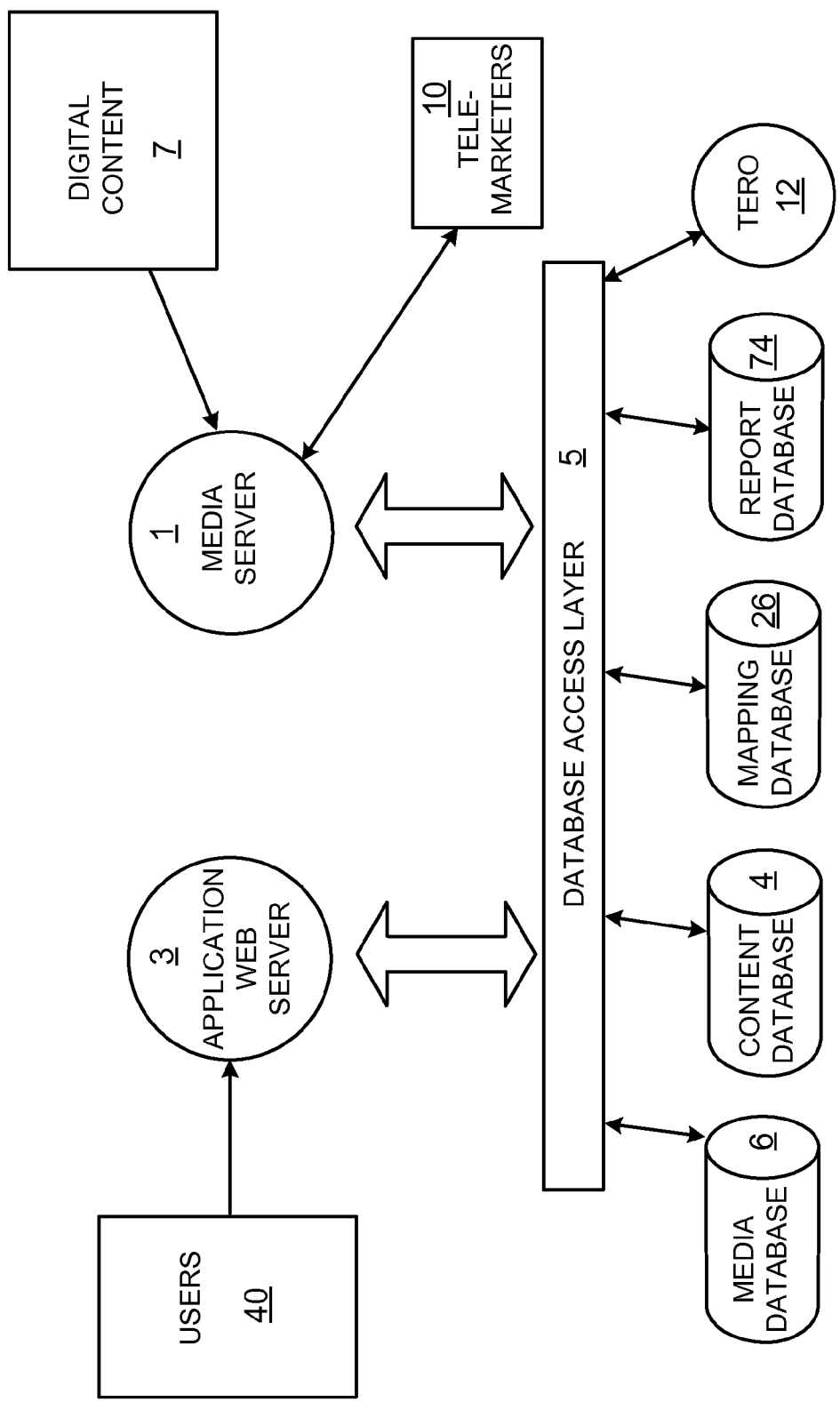
FIG. 1 represents a system for integrating, updating and searching various media data databases and building media lists and reports, in accordance with the invention.

Referring to FIG. 1, the system for integrating, updating, and searching media databases and building media lists and reports includes Media Server (1), Application Web Server (3), Database Access Layer (5), Content Database (4), Media Database (6), Mapping Database (26), Report Database (74), Tero (12) and Telemarketers (10).

Media Server (1) receives Digital Content (7) from several sources that are referred to as feeds. The sources of Digital Content (7) (i.e., feeds) include, but are not limited to, content providers (such as LexisNexis®, Google™ News, etc.), media websites (including blogs), companies who "clip", scan, and compile print, online and broadcast content, TV sources wherein the content is available as transcripts, captured through closed captioning and stored digitally or captured and digitized by voice-to-text software, and radio sources wherein the content is available as transcripts or captured and digitized by voice-to-text software. Media Server (1) reads and writes data from and to Content Database (4), Media Database (6), Mapping Database (26), Report Database (74) and Tero (12) via Database Access Layer (5).

Database Access Layer (5) comprises commercially available programming interfaces and processes utilized by Media Server (1) and Application Web Server (3) to read and write data from and to the various databases.

Users (40) include actual persons using a general computing device and/or remote devices configured to query Application Web Server (3). The User's (40) device, although not illustrated in FIG. 1, further includes software such as an operating system necessary for operation of the computer system and various applications and hardware such as a central processing unit and hard disks. The User's (40) device still further includes hardware (not shown) such as a modem, a Local Area Network (LAN) adapter, etc., for executing a data communication with Application Web Server (3).

Application Web Server (3) may incorporate various types of information servers including, for example, a world wide web ("WWW" or "web") server that provides web pages upon request. Application Web Server (3) is connected to a communications network such as a local area network ("LAN"), a wide area network ("WAN"), a public network, a private network, a virtual private network, a wired network, a wireless network, or various other types of communication networks. The function of the communication network is to carry content between Application Web Server (3) and Users (40).

In certain representative examples provided below, the system is used to build a media list and report that contains, in addition to other information, the names and details for particular journalists, including the identification of any relevant articles or media content the journalist authored. However, as described with respect to FIGS. 5 and 8-11, the system can also be used to build a media list and report that contains the names of and details for particular blogs and/or bloggers.

As shown in FIG. 1, Content Database (4) receives each article of Digital Content (7) in a feed from Media Server (1) via Database Access Layer (5) and stores the article according to its normalized schema (e.g., by byline, headline, summary, publishing time, etc.).

Media Database (6) receives each journalist and corresponding media outlet information of Digital Content (7) in a feed from Media Server (1) via Database Access Layer (5) and stores such journalist and media outlet information according to its normalized schema (i.e. outlet name, journalist name, title, beat, type of publication, outlet contact information, journalist contact information, etc.).

Mapping Database (26) stores mappings between bylines and source outlets of articles in the Content Database (4) and journalists and media outlets in the Media Database (6) via Database Access Layer (5).

Tero (12) maintains an index of current media Digital Content (7). Tero (12) is any commercially available indexing software that can analyze and index the text and support many different native languages, some currently available packages support up to 80 languages.

Communication channel(s) to and from, and/or among, Users (40), Application Web Server (3), Database Access Layer (5), Digital Content (7), Media Server (1), Media Database (6), Content Database (4), Mapping Database (26), Report Database (74) and Tero (12) transmit the electronic data in a timely fashion throughout the system. The communication channel(s) may be any one of local area network (LAN), wide area network (WAN), wireless application protocol (WAP), dedicated lines, satellite or any other device or system for transmitting electronic data in a timely fashion.

Although one User (40), Application Web Server (3), Database Access Layer (5), Digital Content (7), Media Server (1), Media Database (6), Content Database (4), Mapping Database (26), Report Database (74) and Tero (12) are shown, it is understood that any number of users, Application Web Servers, Database Access Layers, Digital Content sources, Media Servers, Media Databases, Content Databases, Mapping Databases, Report Databases and Tero devices may be embodied in accordance with the invention.

Figure 2:
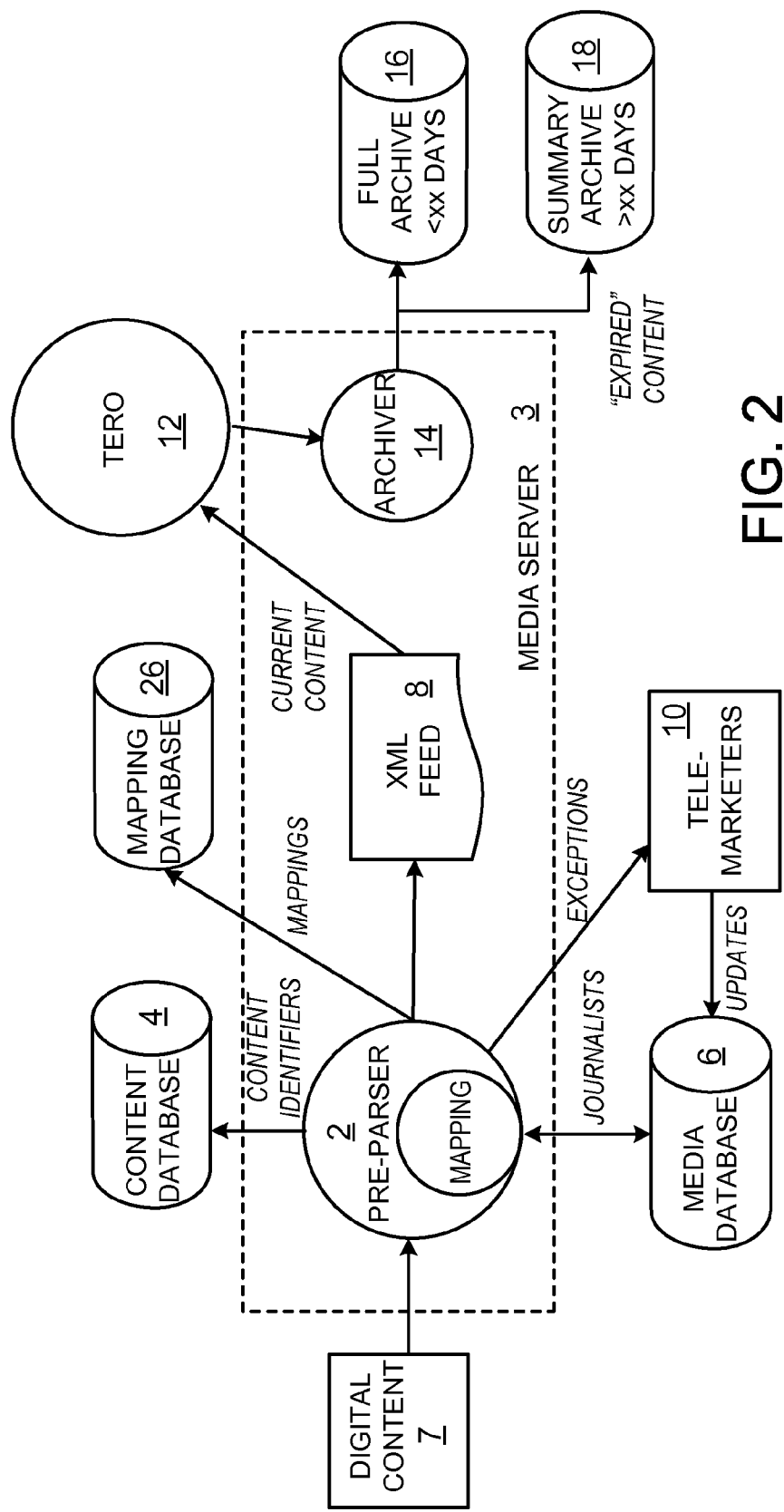
FIG. 2 represents a detailed depiction of the media server of the system of FIG. 1.

Referring to FIG. 2, the Media Server (1) of FIG. 1 further includes Pre-Parser (2), XML feed (8), Tero (12), and Archiver (14).

Pre-Parser (2) of Media Server (1) receives Digital Content (7) in various formats (i.e., XML, ASCII delimited, proprietary tagged formats) and delivery methodologies (i.e. push and pull methods) based on content source examples. Pre-Parser (2) receives each feed and parses out the relevant elements of the content data (i.e. Headlines, bylines, dates, content body, etc.). Pre-Parser (2) sends the parsed elements to Mapping Module (22) and ultimately converts the feed to XML format (8) to be forwarded to Tero (12) for indexing and Archiver (14) for archiving.

Pre-Parser (2) sends Digital Content (7) to be stored to Content Database (4).

Pre-Parser (2) queries and updates the Mapping Database (26) as it processes articles of Digital Content (7). As a result of the mapping processes, Pre-Parser (2) generates two outputs: (i) a normalized XML feed (8) for the Tero (12) and a set of exception reports for Telemarketers (10) research.

Tero (12) maintains an index of current media content. Archiver (14) manages the Tero content and removes expired content. Archiver (14) keeps a full archive (16) of all content for XX days and a Summary Archive (18) with full text removed for >XX days (XX is determined by a number of factors related to business needs and licensing constraints. XX is not a technical limitation).

Figure 3:
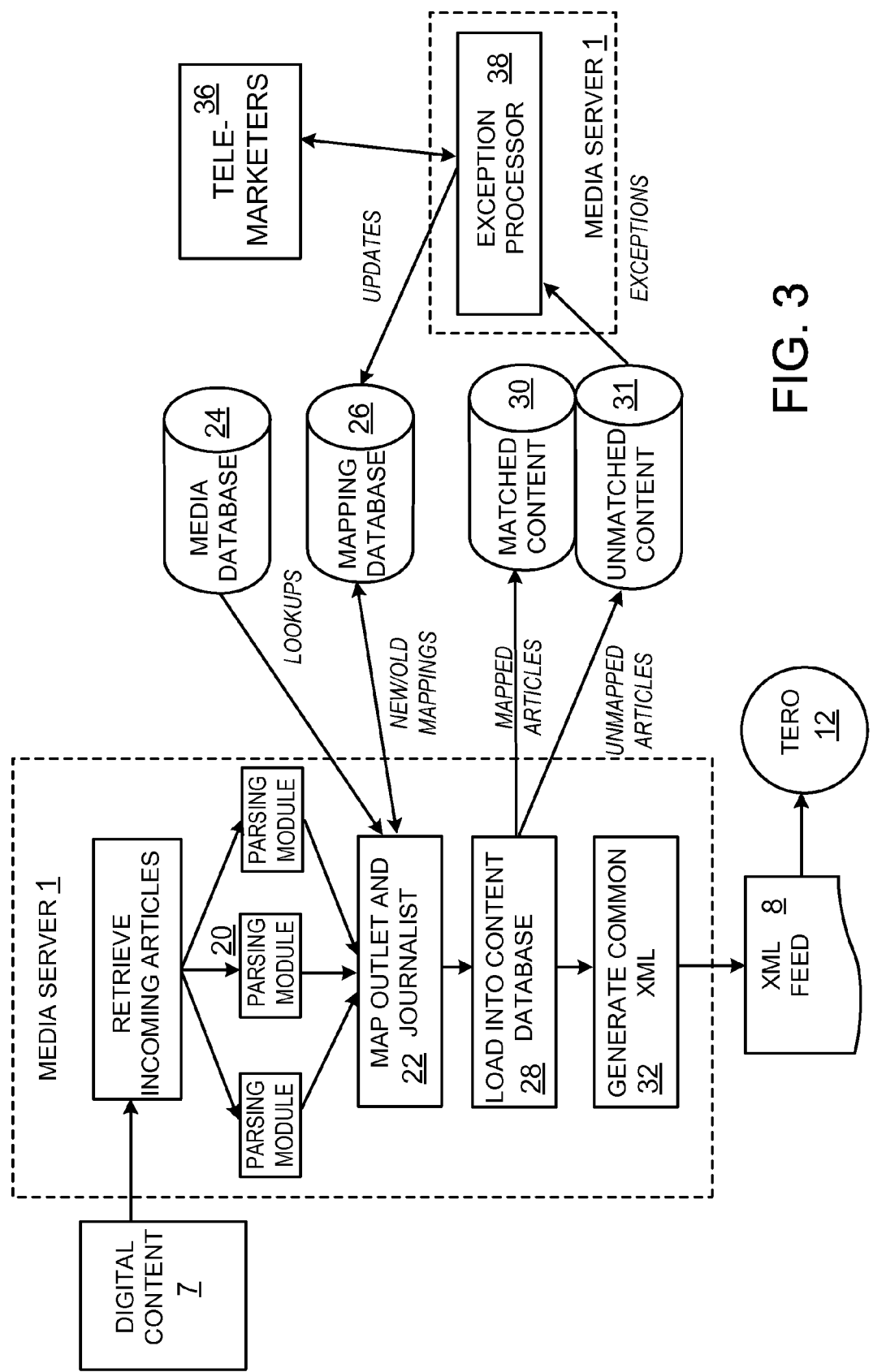
FIG. 3 represents a detailed depiction of the pre-parser of the media server of FIG. 2.

FIG. 3 provides a detailed depiction of Pre-Parser (2) shown in FIG. 2. Referring to FIG. 3, Pre-Parser (2) receives each Digital Content (7) feed in the various formats and delivery methodologies and passes each Digital Content (7) feed through the appropriate parsing module (20) to Mapping Module (22).

Mapping Module (22) compares the received feed to existing mapping information stored in Mapping Database (26). If the received feed does not match any of the existing mapping information, Mapping Module (22) attempts to identify new mapping that is to be stored in Mapping Database (26).

After the mapping process, Pre-Parser (2) loads the digital content article via Mapping Module (22) into either the Matched Content Database (30) of Content Database (4) for articles with mapped journalists, or the Unmatched Content Database (31) of Content Database (4) for articles that could not be mapped to journalists.

The Exceptions Processor (38) pulls data from the Unmatched Content Database (31) and formats a call down project for the Telemarketers (36). The Telemarketers (36) process and update the unmatched content data and send the updated data to Mapping Database (26). Mapping Database (26) forwards the updated data to Mapping Module (22), which loads the updated data into Content Database (4).

Pre-Parser (2) then generates a normalized XML file (32) of the digital content article for processing by Tero (12). The XML file (32) is sent to XML feed (8) which passes the XML file (32) to Tero (12).

Figure 4:
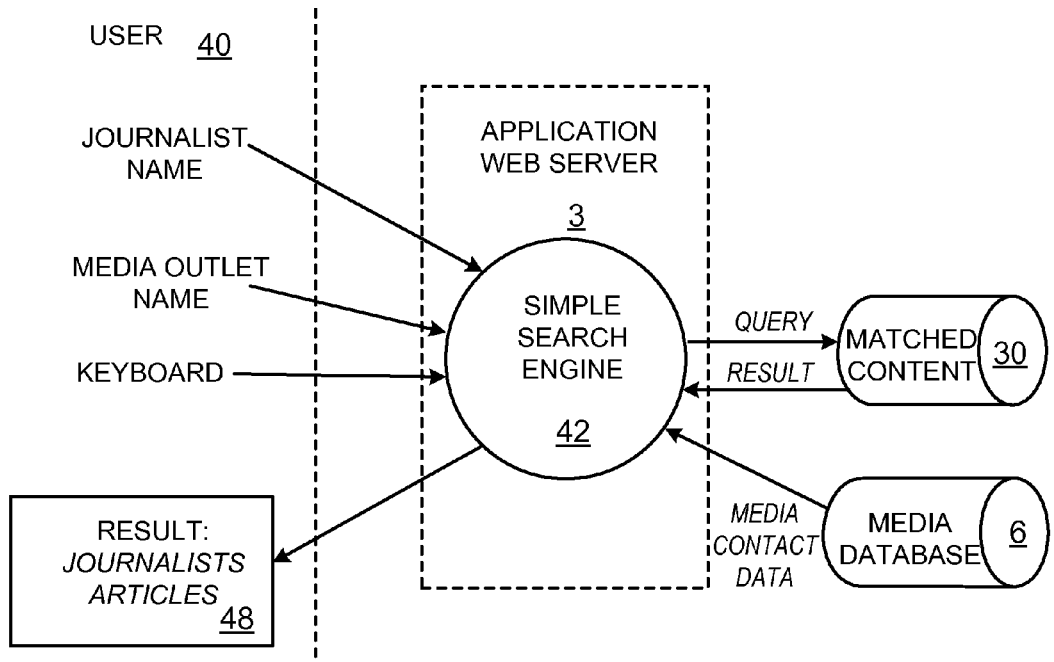
FIG. 4 represents methods for conducting a media content and/or media contact search using the application server of the system of FIG. 1.

Referring to FIG. 4, User (40) conducts a search by accessing Simple Search Engine (42) of Application Web Server (3) from any workstation using a supported Web browser. Simple Search Engine (42) provides User (40) with a web page on which to enter various search criteria. The User (40) can enter any of the following search criteria (i) Journalist Name (ii) Media Outlet Name or (iii) keyword. The Search Criteria and Search Type are then passed to Simple Search Engine (42). Simple Search Engine (42) creates a query and compares the query data to data in the Matched Content Database (30). The results are returned to the Simple Search Engine (42) with the article contents and the identifiers of the media outlet and journalist mapped for the related article. The Simple Search Engine (42) queries the Media Database (46) for media contact data about the media outlet and journalist and then provides the results of the search to the user as a formatted web page (48) with links to more detailed information.

Figure 5:
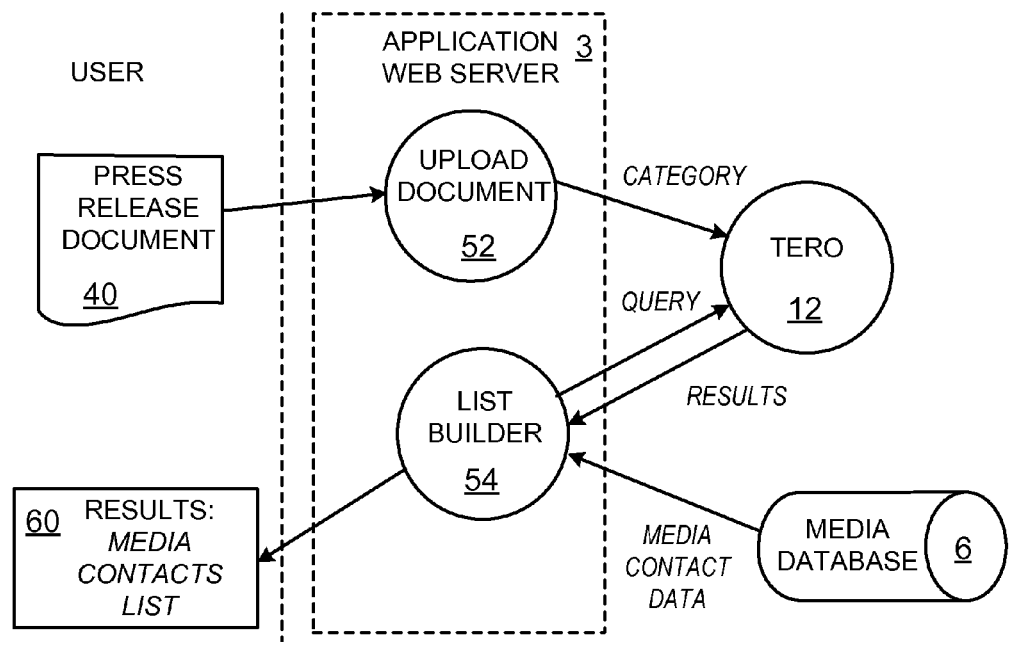
FIG. 5 represents methods for building media lists using the application server of the system of FIG. 1.

Referring to FIG. 5, User (40), such as a public relations professional accessing Application Web Server (3), can build a media list as a Web Page. FIGS. 8-11 provide a representative example of how a public relations professional can use a web page or browser to build a media list and should be referred to in conjunction with FIG. 5 in the discussion that follows.

User (40) can build the media list by inputting into the web page a press release ("target") on a given topic rather than journalist search criteria. Simple Search Engine (42) of Application Web Server (3) can then conduct a MCD search, match the target to all articles in the digital content that match the subject of the target, return to the User (40) a media list containing the names of all journalists (90) and blogs (92) that have recently written on the same topic as the target press release, and provide the User (40) with the ability to view each journalist's and/or blog's recent writing history or content.

Referring to FIG. 5 and FIGS. 8-11, User (40) accesses Application Web Server (3) to (i) upload a press release document or (ii) cut and paste the content of a press release document (50) into the web page. The Upload Doc (52) module of Application Web Server (3) creates a new category in Tero (12) using a Tero Application Processing Index (Tero API) and sets the User's (40) press release document as the Training Document for this press release. Tero (12) uses this training document to seed the category (i.e., search for articles with a predefined percentage of content) with the list of relevant documents.

Figure 10:
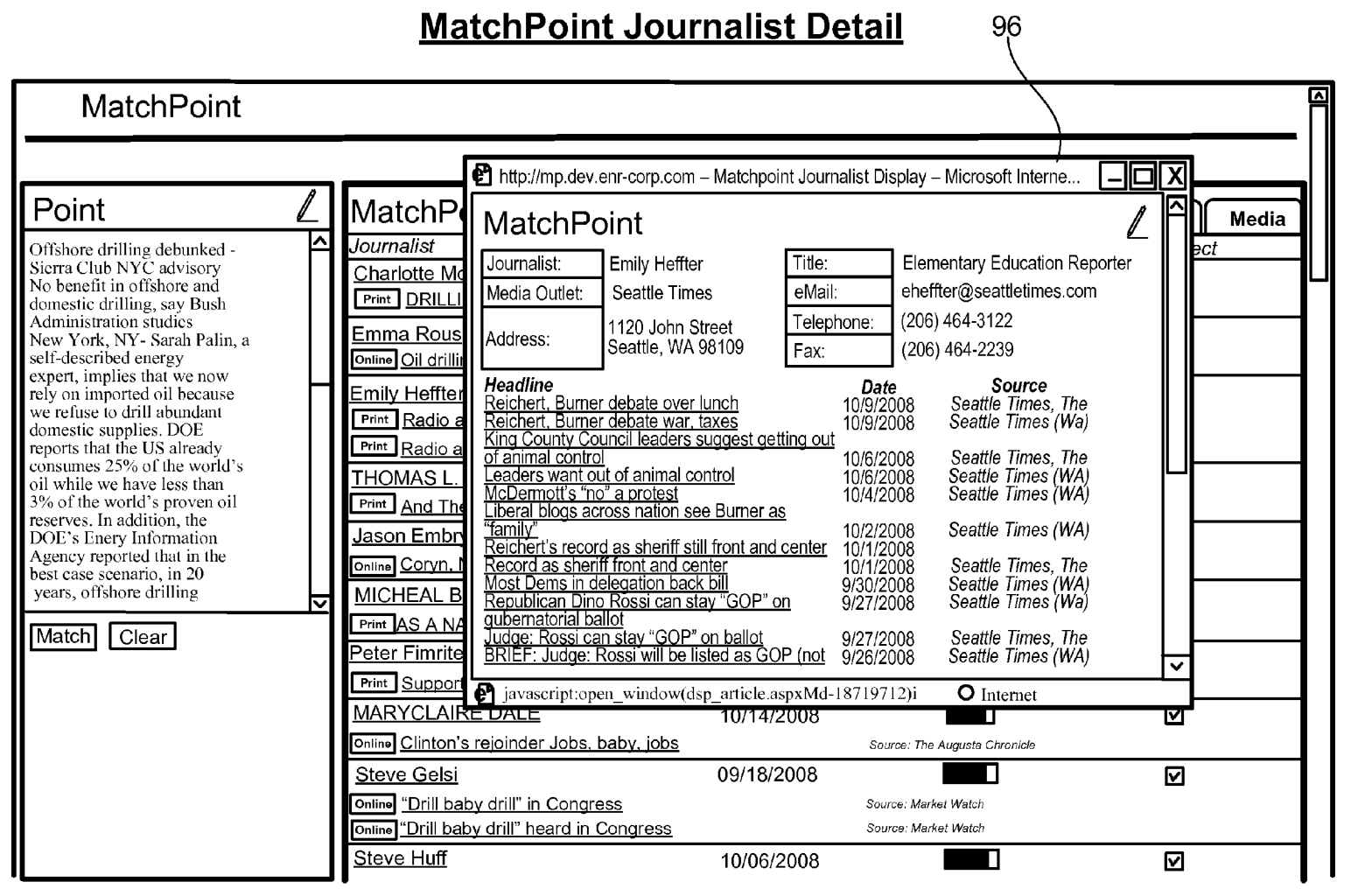

ListBuilder (54) of Application Web Server (3) queries Tero (12) for a list of all articles, including each mapped journalist or blog identity in the newly created category. In certain constructions, ListBuilder (54) sorts the list by relevance, applies filtering as needed, and then looks up the media contact information for each article from the Media Database (6). ListBuilder (54) presents the resulting list to User (40) as a formatted web page (60) with links to more detailed information. For example, as shown in FIG. 10, if the media contact tab (62) has been selected, User (40) can click on a journalist's name (90) to view a Journalist Detail report or a list (96) of recent headlines or storylines authored by the journalist. If the blog tab (64) has been selected, the User (40) can also click on a particular blog (92) to review the discussion contained therein. Subsequent clickthroughs on an article appearing on list (96) for example, provide the User (40) with an abstract of each article and further clickthroughs (See FIG. 11) provide the User (40) with a stored copy of the entire article (94).

Figure 9:
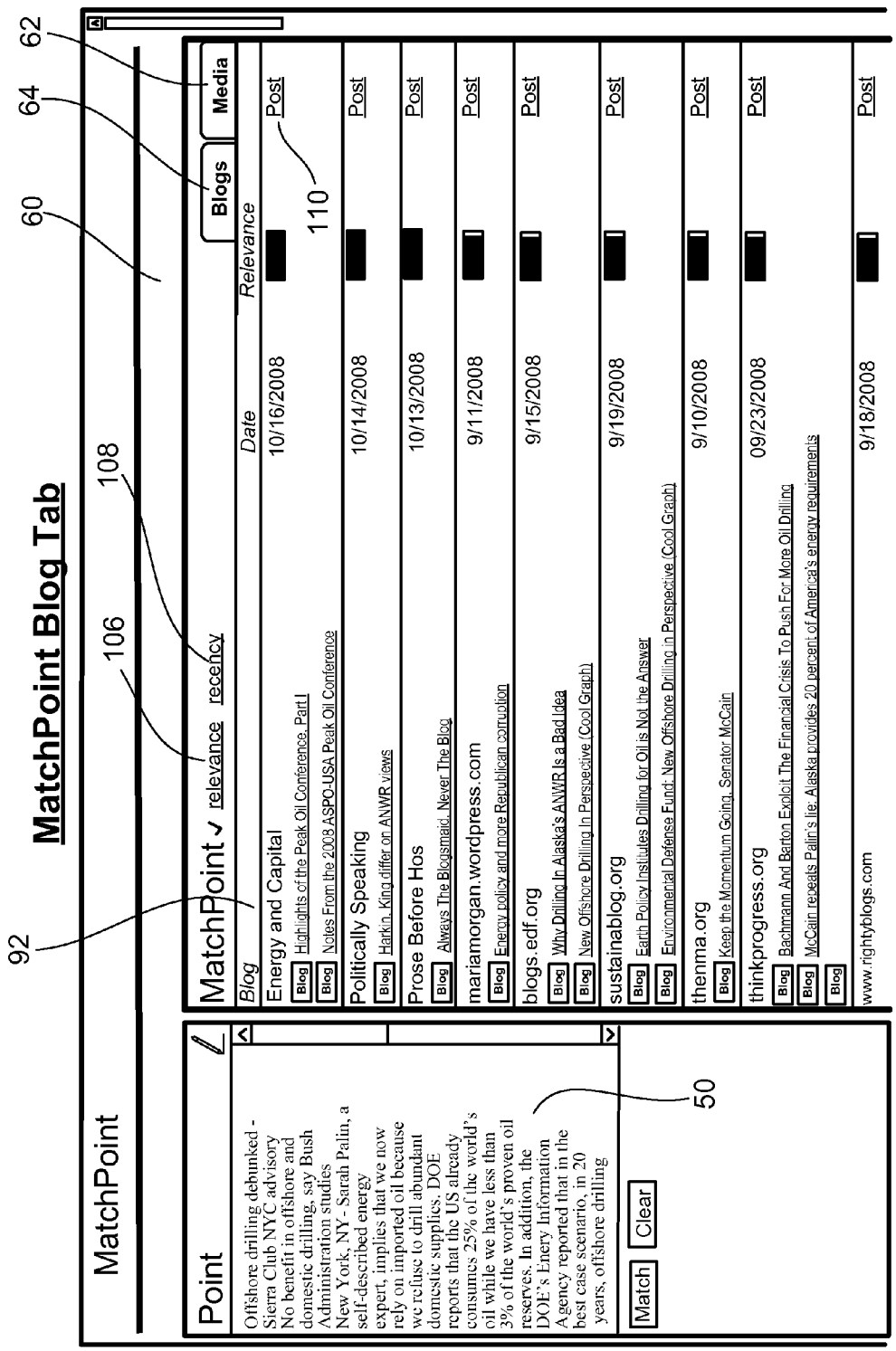
FIG. 9 provides a screen shot of a web page based user search which includes at least a portion of the press release and a results report listing blogs sites and their associated blogs that match the press release.

As shown in FIGS. 8-11, the web site can provide the User (40) with a variety of ways to format a report. For example, buttons 100, 102 and 104, respectively provide the User (40) with the ability to format the journalist report based on relevancy, recency (i.e., how current is the listed article) or frequency (i.e., which journalists write most frequently in a selected area). As shown in FIG. 9, buttons 106 and 108 allow the blog report to be formatted based on relevance and recency. Moreover, the web page can include a button 110, which when selected allows the User (40) to post a response to the blog.

Figure 6:
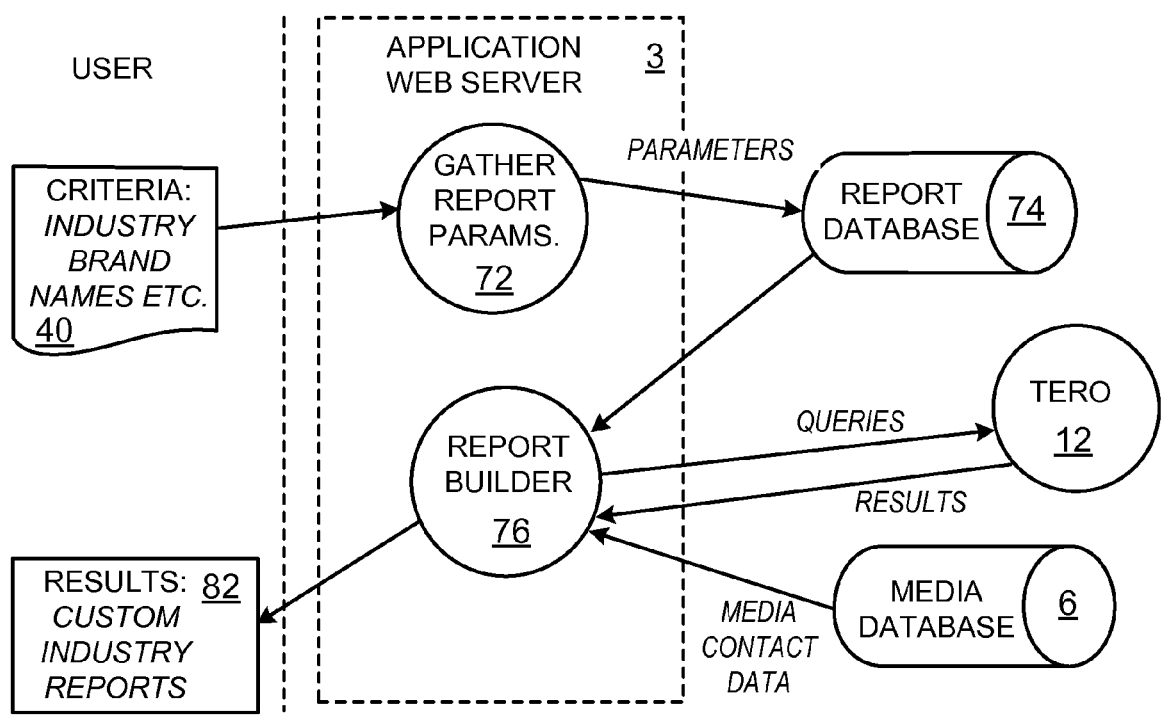
FIG. 6 represents a method for building media reports using the application server of the system of FIG. 1.

Referring to FIG. 6 which describes a further query technique in which User (40) can access Application Web Server (3) to generate a custom industry report. User (40) accesses a system web page of Application Web Server (3) and enters criteria (70) such as Industry, Brand Names, Date Range etc. to be included in a report request. Gather Reports (72) of Application Web Server (3) parses the User's (40) input and generates a standard report request to be stored in the Report Database (74).

Report Builder (76) a processor of Application Web Server (3) receives the standard requests from the Report Database (74) and formats queries against Tero (12). Tero (12) returns the results for the queries which include statistics and supporting articles to Report Builder (76). Report Builder (76) takes the data from the Tero queries and data from Media Database (6) and provides this data to User (40) as a formatted web page with Custom Industry Reports (82) and links to more detailed information.

Figure 7:
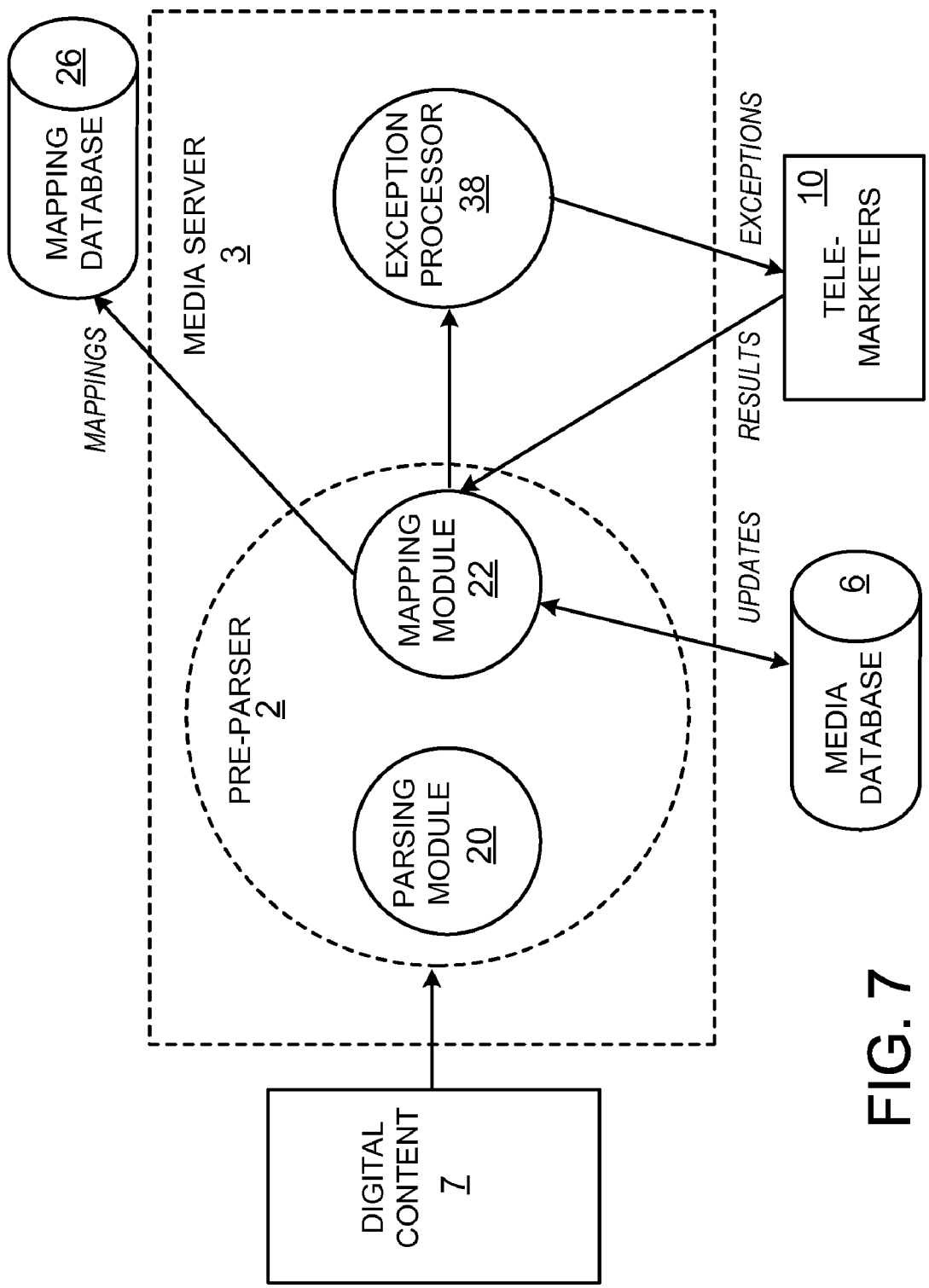
FIG. 7 represents a method for updating the media contact database using the media server of FIG. 2.

Referring to FIG. 7, Pre-Parser (2) receives Digital Content (7) from several sources or feeds. The relevant Parsing Module (20) of Pre-Parser (2) parses the Digital Content (7) article and identifies each Digital Content (7) article including but not limited to media outlet "Source", "Headline", "Section" (where broadcast or print edition of the Digital Content (7) article was found).

Pre-Parser (2) then sends the fields parsed from each piece of Digital Content (7) to a Mapping Module (22) that determines the mapping between the articles "Source" and "Byline" and the Media Databases (24) "media outlet" and "journalist". The Mapping Module (22) uses the Mapping Database (26) to determine if a mapping already exists or uses a series of algorithms to identify a new mapping.

When a match is found, the Section is used to confirm or update the Journalist's beat or coverage data. The Journalist is marked as "ACTIVE" in the Mapping Database (26).

When a Journalist match is found at a different source, the possible alternate source is noted and the Journalist is marked as "REQUIRES UPDATE" in the Mapping Database (26).

When no Journalist match is found at all, the Journalist and Source pair are marked as "NEW" and placed in the daily exception report in the Mapping Database (26).

The REQUIRES UPDATE and NEW exception reports are sent to the Exceptions Processor (38) for processing to remove duplicates and then sent to Telemarketers (10) for updating. Telemarketers (10) are provided with contact information for the Source and all the parsed information available for a Journalist. Telemarketers (10) use a customized script to obtain and update the relevant contact and beat information for the Journalist.

Telemarketers (10) make the necessary calls and return the updated information within a 24-hour time period. Journalists that are not updated in this period are kept longer for further research and updating.

The updated data is processed by Mapping Module (22) and used to update Media Database (6). The Journalist records in the Media Database (6) are marked with an appropriate update date.

It should be understood that the preferred embodiment was described to provide the best illustration of the principles of the invention and its practical application to thereby enable one of ordinary skill in the art to utilize the invention in various embodiments and with various modifications as are suited to the particular use contemplated.

What is claimed is:

1. A computer implemented system for integrating and searching media related databases comprising:
   a first server for receiving digital content from at least one of a plurality of sources;
   a second server for receiving at least one query from at least one user operating at least one of a plurality of user computing devices, wherein the received at least one query from the at least one user comprising a target document, and wherein the target document is one of a document file or a textual content;
   a database access layer being utilized by the first server and the second server to read and write to a plurality of databases,
      wherein the plurality of databases includes a content database and a media database, the content database receiving at least one article of the received digital content from the first server via the database access layer and storing the at least one article, and the media database containing at least one author data and at least one media outlet data;
   a mapping module for matching author data and media outlet data from the received digital content to the at least one author data and the at least one media outlet data contained in the media database; and
   wherein, responsive to the receiving the at least one query from the at least one user comprising the target document, the second server is configured to:
      determine a subject of the target document;
      determine the at least one article of the received digital content stored in the content database that is relevant to the determined subject of the target document;
      for the determined at least one article of the received digital content, determine at least one author data and at least one media outlet data from the matched author data and the matched media outlet data that are mapped to the determined at least one article of the received digital content; and
      provide to the at least one user computing device operated by the at least one user, a list of user-selectable links, wherein at least one of the list of user-selectable links corresponds to the determined at least one article of the received digital content and to the determined at least one author data and the determined at least one media outlet data that are mapped to the determined at least one article of the received digital content.

2. The computer implemented system of claim 1, further comprising a mapping database for storing mapping data between byline data and source outlet data of the at least one article of the received digital content in the content database and the at least one author data and the at least one media outlet data in the media database and for updating the media database.

3. The computer implemented system of claim 2, wherein the first server includes a pre-parser for receiving the digital content including a plurality of articles and parsing out a plurality of data elements from each of the plurality of articles in the digital content.

4. The computer implemented system of claim 3, wherein the parsed plurality of data elements from each of the plurality of articles in the digital content includes at least one of a headline, a byline, a date, a media outlet source, a content body, and a section where a broadcast or a print edition of the article was found.

5. The computer implemented system of claim 3, wherein the pre-parser forwards the parsed plurality of data elements from each of the plurality of articles in the digital content to the mapping module for comparison to the mapping data stored in the mapping database;
   wherein the parsed plurality of data elements from each of the plurality of articles in the digital content are stored in a matched content database for articles that are matched to authors or stored in an unmatched content database for articles that could not be matched to the authors.

6. The computer implemented system of claim 5, wherein the first server further includes an exceptions processor for pulling unmatched digital content data from the unmatched content database and formatting a call down project to telemarketers to update the unmatched digital content data and forward the updated unmatched digital content data to the content database via the mapping module.

7. The computer implemented system of claim 6, wherein the pre-parser generates a normalized Extensible Markup Language (XML) file of the updated unmatched digital content data for processing by the indexing database.

8. The computer implemented system of claim 2, wherein the first server forwards the received digital content to the mapping module for comparison to the mapping data stored in the mapping database and storing the received digital content in a matched content database for articles that are matched to authors or an unmatched content database for articles that could not be matched to the authors.

9. The computer implemented system of claim 8, wherein the second server includes a simple search engine for providing at least one web page to the at least one of the plurality of user computing devices for the at least one user to enter various search criteria.

10. The computer implemented system of claim 9, wherein the various search criteria includes at least one of an author name, a media outlet name or a keyword.

11. The computer implemented system of claim 10, wherein the simple search engine receives search criteria from the at least one of the plurality of user computing devices and the simple search engine creates a query and compares query data to data in the matched content database for articles.

12. The computer implemented system of claim 11, wherein the simple search engine receives query results including the stored mapping data of the at least one article of the received digital content and identifiers of the matched media outlet data and the matched author data with the at least one article of the received digital content.

13. The computer implemented system of claim 12, wherein the simple search engine queries the media database for media contact data about the matched media outlet data and the matched author data and then provides the results of the query to the at least one of the plurality of user computing devices as a formatted web page with links to more detailed information.

14. The computer implemented system of claim 9, wherein the simple search engine receives an uploaded press release document or a cut and paste content of a press release document at the at least one web page from the at least one of the plurality of user computing devices.

15. The computer implemented system of claim 1, further comprising a report database for storing user report requests.

16. The computer implemented system of claim 1, further comprising an indexing database for receiving the digital content from the first server and maintaining an index of the digital content.

17. The computer implemented system of claim 16, further comprising an archiver for receiving the digital content from the indexing database and for managing the indexing database and storing the digital content.

18. The computer implemented system of claim 17, wherein the archiver further includes a full archive for storing a complete text of the digital content for a predetermined period of days and a summary archive for storing a summary of the digital content after the predetermined period of days.

19. The computer implemented system of claim 1, wherein the second server is further configured to:
responsive to a selection by the at least one user of at least one of the list of user-selectable links, provide to the at least one of the plurality of user computing devices operated by the at least one user, information relating to an author identified by the at least one author data and information relating to a media outlet identified by the at least one media outlet data.

20. A method for integrating, searching, and updating media related databases comprising the steps of:
receiving digital content from at least one of a plurality of sources at a first server;
receiving at least one article of digital content from the first server and storing the at least one article of digital content in a content database;
receiving at least one author and at least one media outlet data of the received digital content from the first server and storing the at least one author and the at least one media outlet data in a media database;
storing mapping data between a byline and source outlet data of articles of digital content in the content database and author data and media outlet data in the media database in a mapping database to update the media database;
receiving, at a second server, a query comprising a target document from a user, wherein the target document is one of a document file or a textual content; and
responsive to receiving, at the second server, the query comprising the target document from the user:
determining a subject of the target document;
determining the at least one article of digital content stored in the content database that is relevant to the determined subject of the target document;
for the determined at least one article of digital content, determining at least one author data and at least one media outlet data from the stored mapping data that are mapped to the determined at least one article of digital content; and
providing to at least one user computing device operated by the user, a list of user-selectable links, wherein at least one of the list of user-selectable links corresponds to the determined at least one article of digital content and to the determined at least one author data and the determined at least one media outlet data that are mapped to the determined at least one article of digital content.

21. A method for integrating, searching, and updating media related databases comprising the steps of:
receiving digital content from at least one of a plurality of sources at a first server that includes a pre-parser;
storing the received digital content in a content database;
parsing out a plurality of data elements from each of a plurality of articles in the received digital content using the pre-parser, wherein the plurality of data elements includes at least one of a headline, a byline, a date, a media outlet source, a content body, and a section where a broadcast or a print edition of the article was found;
forwarding the parsed plurality of data elements from each of the plurality of articles in the received digital content to a mapping module for comparison to mapping data stored in a mapping database, wherein the mapping data includes mapping data between a byline and source outlet data of articles in the content database and author data and media outlet data in a media database;
storing the parsed plurality of data elements of from each of the plurality of articles in the received digital content in a matched content database for articles that are matched to authors;
storing the parsed plurality of data elements from each of the plurality of articles in the received digital content in an unmatched content database for articles that could not be matched to the authors;
pulling unmatched digital content data from the unmatched content database at an exceptions processor of the first server and formatting a call down project to telemarketers to update the unmatched digital content data;
forwarding the updated unmatched digital content data to a the content database via the mapping module;
receiving, at a second server, a query comprising a target document from a user, wherein the target document is one of a document file or a textual content; and
responsive to receiving, at the second server, a the query comprising the target document from the user:
determining a subject of the target document;
determining at least one article of the received digital content stored in the content database that is relevant to the determined subject of the target document;
for the determined at least one article of the received digital content, determining at least one author data and at least one media outlet data from the stored mapping data that are mapped to the determined at least one article of the received digital content; and
providing to at least one user computing device operated by the user, a list of user-selectable links, wherein at least one of the list of user-selectable links corresponds to the determined at least one article of the received digital content and to the determined at least one author data and the determined at least one media outlet data that are mapped to the determined at least one article of the received digital content.

* * * * *